(12) United States Patent
Moona et al.

(10) Patent No.: US 8,713,655 B2
(45) Date of Patent: Apr. 29, 2014

(54) METHOD AND SYSTEM FOR USING PERSONAL DEVICES FOR AUTHENTICATION AND SERVICE ACCESS AT SERVICE OUTLETS

(75) Inventors: Rajat Moona, Uttar Pradesh (IN); Abhishek Gaurav, Jharkhand (IN); Ankit Sharma, Madhya Pradesh (IN); Vikas Gelara, Rajasthan (IN)

(73) Assignee: Indian Institute of Technology, Kanpur, Uttar Pradish (IN)

( * ) Notice: Subject to any disclaimer, the term of this patent is extended or adjusted under 35 U.S.C. 154(b) by 1000 days.

(21) Appl. No.: 12/386,554

(22) Filed: Apr. 20, 2009

(65) Prior Publication Data

US 2009/0265544 A1  Oct. 22, 2009

(30) Foreign Application Priority Data

Apr. 21, 2008  (IN) .......................... 1018/DEL/2008

(51) Int. Cl.
*G06F 15/16*  (2006.01)
(52) U.S. Cl.
USPC ............................................................ 726/7
(58) Field of Classification Search
USPC ....................................................... 726/6–7
See application file for complete search history.

(56) References Cited

U.S. PATENT DOCUMENTS

| 4,438,824 | A | 3/1984 | Mueller-Schloer |
| 4,993,068 | A | 2/1991 | Piosenka |
| 6,016,476 | A * | 1/2000 | Maes et al. ...................... 705/18 |
| 4,868,376 | A1 | 5/2002 | Ehrensvard |
| 6,616,035 | B2 | 9/2003 | Ehrensvard |
| 2002/0047049 | A1 | 4/2002 | Perron |
| 2003/0182221 | A1* | 9/2003 | Forrest et al. ................... 705/36 |
| 2004/0039911 | A1* | 2/2004 | Oka et al. ...................... 713/175 |
| 2005/0109835 | A1 | 5/2005 | Jacoby |
| 2006/0206709 | A1 | 9/2006 | Labrou |
| 2006/0242693 | A1 | 10/2006 | Kussmaul |
| 2007/0005511 | A1 | 1/2007 | Martinez |

* cited by examiner

*Primary Examiner* — Brandon Hoffman
*Assistant Examiner* — Anthony Brown

(57) ABSTRACT

Various embodiments of the present invention provide a method and an interaction system. A first set of information related to a user is received from a personal communication device with or without an embedded secure element, or from an independent secure element at a service outlet. The personal communication device and the secure element are associated with the user. Further, a trust is established between the service outlet and the secure element by a process of mutual authentication. If a personal communication device is used, a communication channel is established between the personal communication device and the service outlet. Thereafter, the user is provided access to multiple services offered by the service provider over the communication channel through the personal communication device. If a personal communication device is not used, the services are provided through the access point of the service outlet.

54 Claims, 13 Drawing Sheets

METHOD AND SYSTEM FOR USING PERSONAL DEVICES FOR AUTHENTICATION AND SERVICE ACCESS AT SERVICE OUTLETS

REFERENCE TO RELATED APPLICATION

This application claims the priority of non-provisional patent application filed in India, Serial Number 1018/Del/2008, filed Apr. 21, 2008, titled, 'Using Personal Devices for Authentication and Service Access at Service Outlets', the disclosure of which is incorporated herein by reference for all purposes.

BACKGROUND

The invention relates generally to accessing services from a service outlet. More specifically, it relates to authenticated and secure communication between a user and a service outlet associated with a service provider, for accessing services from the service outlet.

Typically, a service outlet facilitates multiple users to access services offered by a service provider. The service outlet acts as an interface between a user and the service provider, enabling the user to access the services without the need to directly communicate with the service provider. Examples of the services include, but are not limited to, online shopping, bank transactions, and online payments. Further, examples of the service outlet include, but are not limited to, Automated Teller Machines (ATM), music kiosks, and credit/debit card readers.

A service outlet allows a user to access the services if the user is registered with the service provider. The user can send his/her personal information to the service provider to seek registration, and in response, the user receives a set of registration information from the service provider. Examples of the personal information include, but are not limited to, name of the user, address of the user, age of the user, and public key of the user. Examples of the registration information include, but are not limited to, digital certificates and public keys of the service provider. Thereafter, the service outlet authenticates the user after ascertaining if the user is registered with the service provider.

After the user is authenticated by the service outlet, a communication channel is established between the service outlet and the user. The communication channel allows the user and the service outlet to exchange messages. The messages exchanged may include personal information of the user and the service outlet. The personal information of the user and the service outlet comprises public information and private information of the user and the service outlet. Examples of the private and public information of a user include, but are not limited to, age of the user, date of birth of the user, bank account number of the user, and name of the user, respectively. Examples of the personal information of the user include, but are not limited to, credit card number, Personal Identification Number (PIN), and account number. Examples of the personal information of the service outlet include, but are not limited to, public keys, digital signatures, and digital certificates. The personal information of the user and the service outlet is protected from intrusion by using a secure communication channel, to avoid misuse of the personal information.

Conventionally, before providing access to services of a service provider to a user, the user can be authenticated by a service outlet based on unique personal identifiers provided by the user. For example, a user, for authentication purpose, can provide his/her name, customer number, credit card number, social security number, and so forth. In some cases, the service outlet also requires a set of secret information for authentication, for example, pass codes or finger prints. Thereafter, a lookup is performed for the personal identifier and the set of secret information on a user registration database, which is stored on a central server. If the lookup is successful, a positive response is received to confirm authentication of the user.

Typically, service outlets that are provided with support system of Integrated Circuit Cards (ICCs) have a slot for inserting or swiping an ICC, which can also be used for authenticating a user. The ICC corresponding to the user contains registration information of the user. When the ICC is inserted or swiped through the slot, the registration information of the user is retrieved, and the user is authenticated based on the set of registration information.

Further, in accordance with another method for providing a user access to the services of a service provider, cryptographic techniques with challenge response procedures are used for secure information exchange between the user and a service outlet. According to this method, a message to be exchanged between a challenger and a respondent may include a challenge, included in the message by the challenger. Further, only the challenger is capable of checking the integrity of the response message received from the respondent.

Further, the challenge response procedures are used by a challenger to establish the authenticity of a respondent. According to the challenge response procedures, the challenger issues a challenge to the respondent. When the respondent receives the challenge, it generates a response using cryptographic techniques, and sends it to the challenger. The response is then verified by the challenger to establish authenticity of the respondent. In an embodiment, the service outlet acts as the challenger and the user acts as the respondent. Further, in some challenge response procedures that involve a service outlet and a user, an additional step is performed with the user as the challenger and the service outlet as the respondent, to establish mutual authentication between the service outlet and the user.

Mobile devices can also be used for authentication of a user before providing him/her access to the services of the service provider. Authentication information pertaining to a user is stored in a mobile device, and the service outlet uses this information to authenticate the user. Further, the user and the service outlet can mutually authenticate each other, based on the information stored in the mobile device and the service outlet.

However, conventional methods and systems such as looking up a user's personal identifiers in a user registration database saved in a central server, inserting an ICC in a slot of a service outlet, using cryptographic techniques, and using mobile devices for providing access to services have one or more of the following disadvantages.

Generally, authenticating a user by checking his/her personal identifiers in a user registration database by the service outlet leads to long transaction times. Further, the communication between the service outlet and the registration database depends on a communication channel between the service outlet and the central server which may create reliability issues in the system.

In addition, typically, service outlets do not enable users to authenticate the service outlets. Therefore, counterfeit service outlets or fake outlets may misguide a user by posing as an authentic service outlet, and obtain private information from the user.

In some methods, authentication by the service outlet is limited only to biometric mechanisms.

While using a mobile device for authentication, the service outlet uses a Personal Identification Entry (PIE) of the user and an identity of the mobile device. Use of the identity of the mobile device makes the authentication device-specific. Also, the mobile device associated with the user may not have any processing power restricting the use of the mobile device in public-key infrastructure-based authentication schemes.

In methods that use the mobile device associated with the user for mutual authentication with the service outlet, there is no provision for accessing services from the service outlet through the mobile device.

In light of the foregoing discussion, there is a need for a method and a system for facilitating a user to access services of a service provider through a service outlet by using a portable device, which allows the service outlet to authenticate the user based on the information stored in the service outlet. Further, there is a need for a method and a system for facilitating a user to access services from a service outlet using a portable device, which allows mutual authentication between the user and the service outlet. Also, there is a need for a method and a system for facilitating a user to access services from a service outlet using a mobile device that allows public-key infrastructure-based authentication. Further, there is a need for a method and a system for facilitating a user to access services from a service outlet by using any mobile device.

SUMMARY

An objective of the present invention is to provide a user access to multiple services offered by a service provider through a service outlet.

Another objective of the present invention is to provide a user access to multiple services offered by a service provider through a service outlet and a personal communication device associated with the user.

Yet another objective of the present invention is to provide a user access to multiple services offered by a service provider through a service outlet and a personal communication device associated with the user after the authentication of the user by the service outlet.

Still another objective of the present invention is to provide a user access to multiple services offered by a service provider through a service outlet and a personal communication device associated with the user by mutual authentication between the service outlet and the user.

Various embodiments of the present invention provide a method and an interaction system for providing a user access to a plurality of services offered by a service provider. The user accesses the plurality of services by using a portable device such as a personal communication device. In accordance with an embodiment of the present invention, the user is authenticated by a service outlet associated with the service provider based on the information provided by the user. In accordance with another embodiment of the present invention, the user authenticates the service outlet and the service outlet authenticates the user before providing the user access to the services.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Various embodiments of the present invention provide a method and an interaction system for accessing services from a service outlet by a user. The method and the interaction system use a personal communication device associated with the user to enable the user to access the services from the service outlet.

Figure 1:
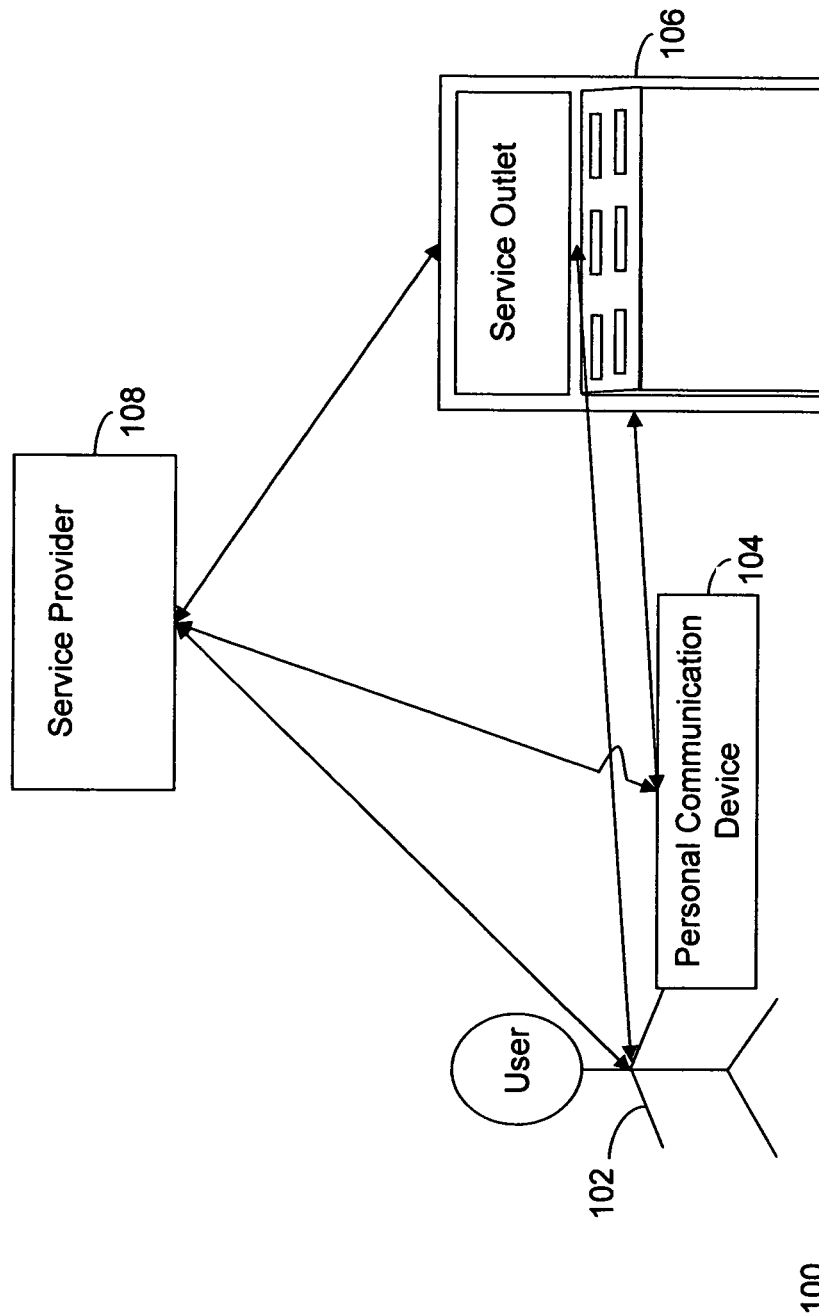
FIG. 1 shows an exemplary environment where various embodiments of the present invention can be practiced.

FIG. 1 shows an exemplary environment 100 where various embodiments of the present invention can be practiced. Those skilled in the art will appreciate that environment 100 may include all or even a fewer number of components than the components shown in FIG. 1. Further, those with ordinary skill in the art will understand that environment 100 may include additional components that are not shown here and are not germane to the operation of the present invention.

For exemplary purposes, environment 100 includes a user 102, a personal communication device 104, a service outlet 106, and a service provider 108.

User 102 accesses services offered by service provider 108 through service outlet 106. User 102 provides a set of information to service outlet 106 to access the services. According to an embodiment of the present invention, service outlet 106 authenticates user 102 based on the set of information provided by user 102 before providing access to the services of service provider 108. Examples of service provider 108 include, but are not limited to, banks, credit card providers, and online shops. Examples of the services include, but are not limited to, bank services, credit card services, and online shopping services. Examples of service outlet 106 include, but are not limited to, Automated Teller Machines (ATM), shopping kiosks, and music kiosks.

Service outlet 106 receives the set of information from user 102 and allows user 102 to access the services offered by service provider 108. Service outlet 106 also communicates with service provider 108 to exchange information such as the information related to the user that is stored at service provider 108 and information of transactions at service outlet 106.

In accordance with another embodiment of the present invention, user 102 uses personal communication device 104 to provide the set of information to service outlet 106. Personal communication device 104 communicates with service outlet 106 to provide the set of information from user 102 to service outlet 106. Thereafter, user 102 accesses the services through personal communication device 104. Examples of personal communication device 104 include, but are not limited to, mobile phones, Personal Digital Assistants (PDAs), and laptops.

User 102 is allowed to access the services offered by service outlet 106 if the user is registered with service provider 108. Service provider 108 stores the information pertaining to users registered with service provider 108 in multiple central servers. Service provider 108 compares the set of information provided by user 102 to service outlet 106 with the information stored in the central servers. If the set of information provided by user 102 matches the information stored in the central servers, service provider 108 allows user 102 to access the services through service outlet 106.

Figure 2:
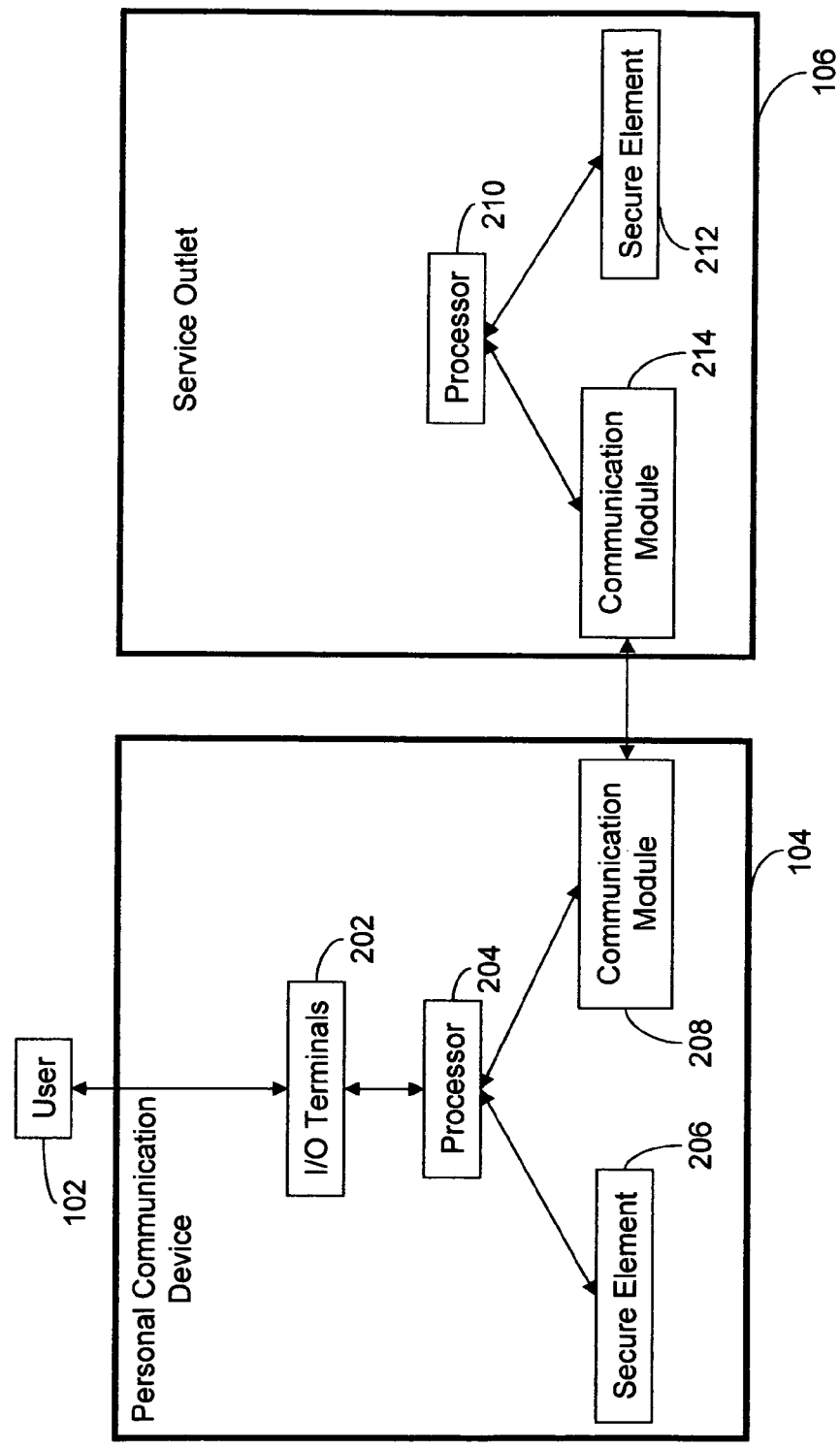
FIG. 2 illustrates components of an interaction system, in accordance with various embodiments of the present invention.

FIG. 2 illustrates components of an interaction system 200, in accordance with various embodiments of the present invention. Interaction system 200 can include multiple users, multiple personal communication devices, and/or multiple service outlets. However, for the purpose of illustration, interaction system 200 is shown to include user 102, personal communication device 104, and service outlet 106. Personal communication device 104 includes input/output terminals 202, a processor 204, a secure element 206, and a communication module 208. Service outlet 106 includes a processor 210, a secure element 212, and a communication module 214.

Personal communication device 104 includes input/output terminals 202, hereinafter referred to as I/O terminals 202, which enable user 102 to input information into personal communication device 104. Examples of the information input into personal communication device 104 include, but are not limited to, name of user 102, address of user 102 personal identification code of user 102, finger print or other biometric information of user 102, transaction details, service class etc. I/O terminals 202 enable user 102 to access his/her personal information stored in personal communication device 104.

Personal communication device 104 further includes processor 204, which performs computational tasks of personal communication device 104. Examples of the computational tasks include, but are not limited to, cryptographic authentication of the service outlet, verification of authentication responses, and establishment of session keys for communication. Processor 204 in personal communication device 104 communicates with secure element 206 and communication module 208 to fetch an information to be processed. Processor 204 also provides the results obtained after processing the fetched information to secure element 206 and communication module 208.

Personal communication device 104 also includes secure element 206, which stores a set of secret information and a set of protected information of user 102. Further, secure element 206 performs computational tasks on the set of secret information of user 102. According to an embodiment, the set of secret information includes a private key of user 102. The set of protected information may be accessible to user 102. In accordance with an embodiment of the present invention, access to the set of secret information or access to the computational results using the secret information is governed by a secrecy criterion. The secrecy criterion depends on the requirements of the services provided by service outlet 106 and privacy concerns of user 102.

Secure element 206 can further store a set of protected information which can be read, written or modified by authorized entities. Examples of secure element 206 include, but are not limited to, a smart card, a radio frequency-enabled card, a Near Field Communication (NFC)-enabled card, a Subscriber's Identity Module (SIM), an e-token, and a separate secure memory unit.

In accordance with an embodiment, secure element 206 may directly communicate with service outlet 106 bypassing communication with personal communication device 104.

Further, personal communication device 104 includes communication module 208, which enables personal communication device 104 to communicate with service outlet 106. Personal communication device 104 communicates with service outlet 106 to authenticate, exchange information, and exchange the services offered by service outlet 106.

In an embodiment, processor 204 communicates with secure element 206 during the authentication of personal communication device 104. In another embodiment of the present invention, secure element 206 of the personal communication device may be present on a device other than personal communication device 104.

According to an embodiment of the present invention, personal communication device 104 may not include secure element 206.

According to another embodiment of the present invention, personal communication device 104 may not include I/O terminals 202, processor 204, and communication module 208. In this scenario, personal communication device includes only secure element 206.

Further, FIG. 2 includes service outlet 106, which provides user 102 access to the services offered by service provider 108. Service outlet 106 includes processor 210, which performs computational tasks of service outlet 106. Further, service outlet 106 include secure element 212, which stores the secret information of service outlet 106. Additionally, service outlet 106 includes communication module 214, which communicates with communication module 208. According to an embodiment of the present invention, service outlet 106 may not include secure element 212.

Processor 210 communicates with communication module 214 to fetch the information to be processed. Processor 210 also communicates with secure element 212 to compute the results of processing of the fetched information and communication module 214 to provide the results of processing the fetched information. In another embodiment of the present invention, processor 210 may compute the results of processing of the fetched information independent of the secure element 212 and communicate the results using the communication module 214.

Communication module 214 communicates with personal communication device 104 through communication module 208. Communication module 214 communicates with communication module 208 over a communication medium. The communication medium between communication module 208 and communication module 214 can be a wireless medium or a wired medium or a combination of a wireless medium and a wired medium. Examples of a wireless medium include, but are not limited to, Bluetooth, Near Field Communication (NFC), and infrared. Examples of a wired medium include, but are not limited to, serial port cables and Universal Serial Bus (USB) devices.

Figure 3:
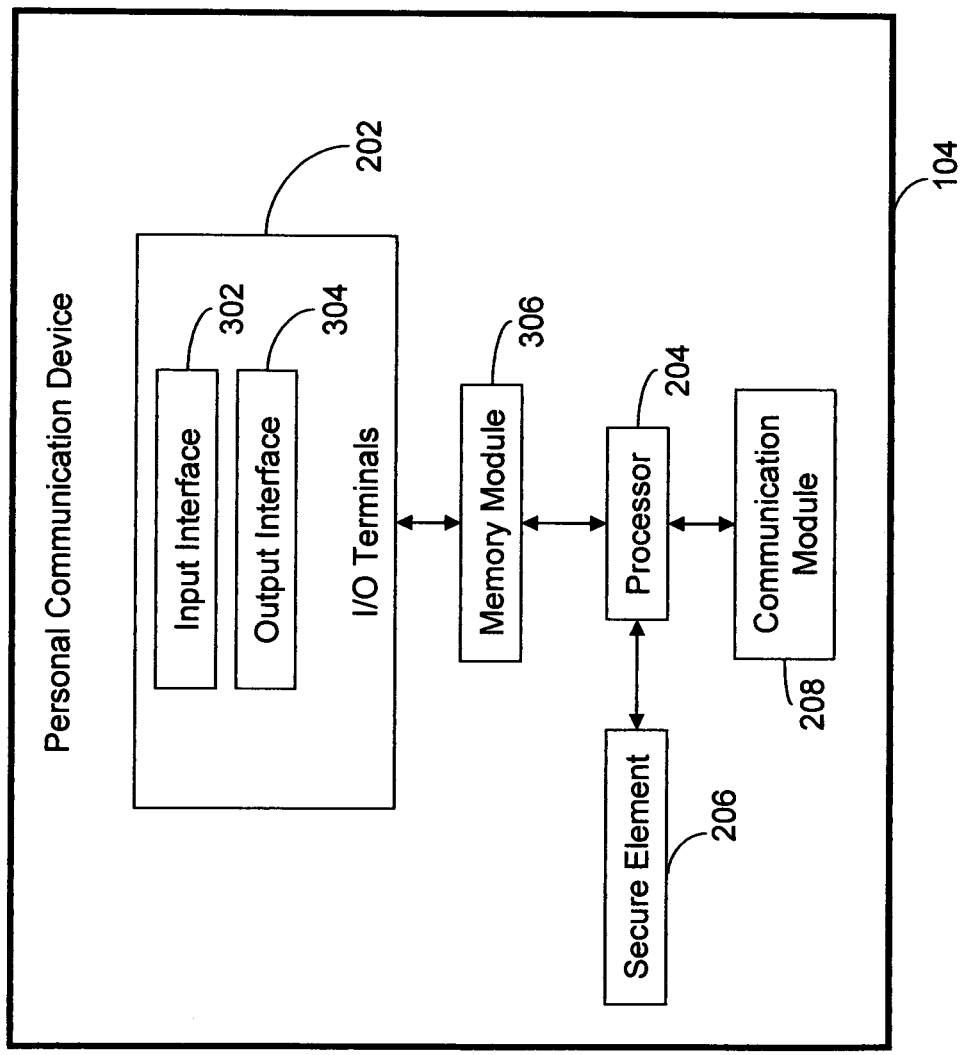
FIG. 3 illustrates various components of a personal communication device, in accordance with various embodiments of the present invention.

FIG. 3 illustrates various components of personal communication device 104, in accordance with various embodiments of the present invention. Exemplary functionalities of personal communication device 104 include, but are not limited to, authenticating user 102, enabling user 102 to authenticate himself/herself with service outlet 106, establishing a mutual trust between user 102 and service outlet 106, accessing the services provided by service provider 108 through service outlet 106, and providing the account information of user 102 to service outlet 106.

Personal communication device 104 includes I/O terminals 202, which further include an input interface 302, which enables user 102 to issue commands and provide information to personal communication device 104. Examples of input interface 302 include, but are not limited to, a keypad, a touchpad, a touch screen, a voice-based input terminal, and a joystick. Examples of the commands include, but are not limited to, commands for authentication and commands for accessing services. Examples of the information input into personal communication device 104 include, but are not limited to, name of user 102, address of user 102 finger print of user 102, biometric information of user 102 and personal identification code of user 102. I/O terminals 202 also include an output interface 304 to view the information stored in or processed by personal communication device 104. Examples of output interface 304 include, but are not limited to, a display screen and sound-based output terminals. Input interface 302 and output interface 304 collectively enable user 102 to access the services through service outlet 106.

Additionally, personal communication device 104 includes memory module 306, which stores instructions and data. Memory module 306 communicates with processor 204 to provide the instructions to processor 204. Further, memory module 306 provides data to processor 204 and fetches data from processor 204.

Figure 4:
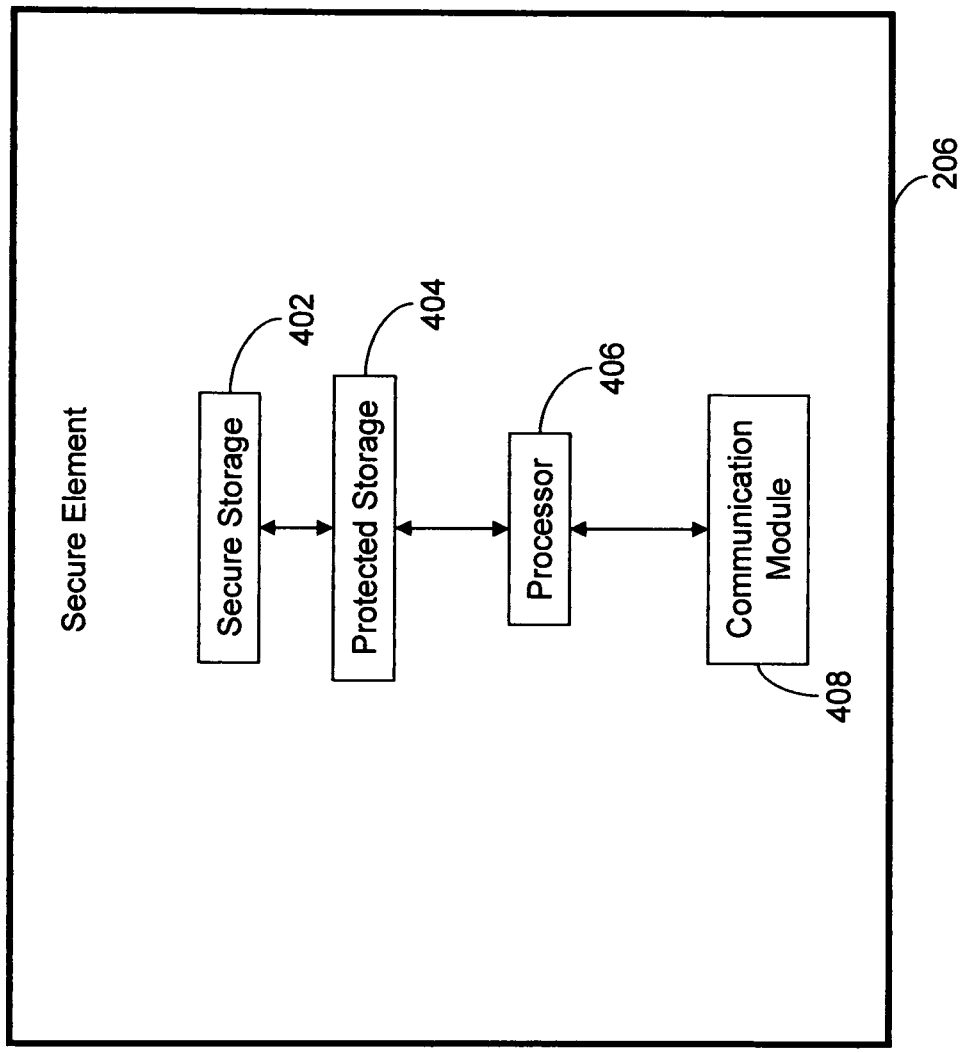
FIG. 4 illustrates various components of a secure element, in accordance with various embodiments of the present invention.

FIG. 4 illustrates various components of secure element 206, in accordance with various embodiments of the present invention. Secure element 206 facilitates authentication of user 102 by entities such as service outlet 106. Secure element 206 may also facilitate authentication of entities such as service outlet 106 to the user 102.

Secure element 206 includes a secure storage 402, which stores the set of secret information. The set of secret information is stored in secure storage 402 such that it is not accessible to user 102. Examples of the set of secret information include but are not limited to, a private key of user 102, and passwords and personal identity numbers of the user 102.

Further, secure element 206 includes a protected storage 404, which stores the set of protected information such that the set of protected information is accessible to user 102. Further, according to an embodiment of the invention, the part of protected information may be stored such that it can be modified by user 102. Examples of the set of protected information include, but are not limited to, account information of user 102 and digital certificate for the public key of user 102.

A set of information in secure element 206 is stored in secure storage 402 and protected storage 404 depending upon the requirements of service outlet 106 and the kind of authentication to be established between user 102 and service outlet 106. In another embodiment of this invention, secure storage 402 and protected storage 404 may be combined into a single entity and protection by the software that runs on processor 406.

Furthermore, secure element 206 includes a processor 406, which performs computational tasks on the set of secret information and the set of protected information. The computational tasks on the set of secret information are performed to obtain processed results. The processed results are used by user 102 for authentication with service outlet 106.

Secure element 206 also includes a communication module 408, which enables communication between secure element 206 and service outlet 106 and/or personal communication 104.

In an embodiment of the present invention, secure element 206 is included in personal communication device 104 associated with user 102. In another embodiment of the present invention, the protected information may be split and stored among protected storage 404 and memory module 306 of personal communication device 104.

In yet another embodiment, secure element 206 is included in a device other than personal communication device 104 associated with user 102. In still another embodiment, secure element 206 may be carried as a separate entity and may be connected directly to the service outlet 106.

Figure 5:
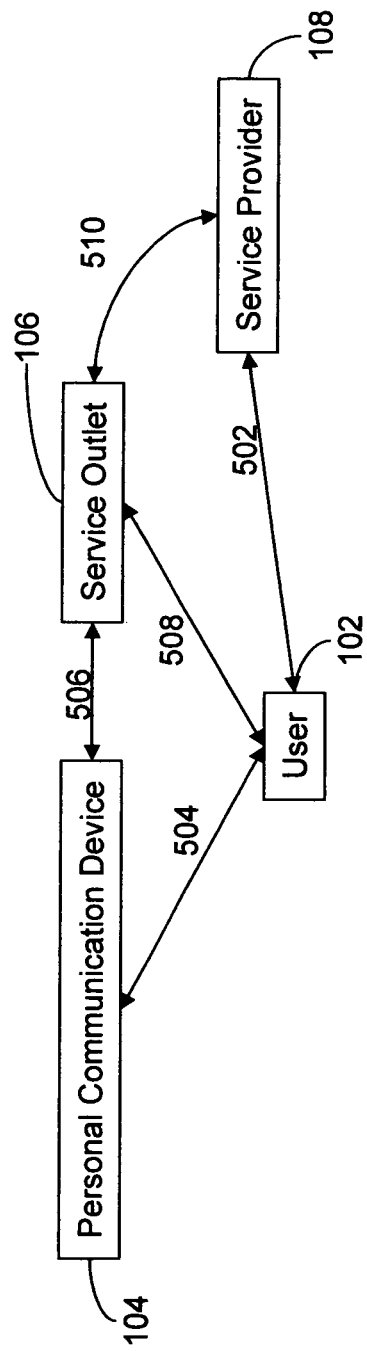
FIG. 5 illustrates an interaction system, in accordance with various embodiments of the present invention.

FIG. 5 illustrates an interaction system 500, in accordance with various embodiments of the present invention. Interaction system 500 can include a number of users, a number of personal communication devices, and a number of service outlets. For the purpose of this description, interaction system 500 is shown to include user 102, personal communication device 104 associated with user 102, service outlet 106, and service provider 108.

In interaction system 500, service provider 108 offers services to user 102, who is a registered user with service provider 108. User 102 uses personal communication device 104 to access the services from service outlet 106.

Further, interaction system 500 includes communication channels 502, 504, 506, 508, and 510. Communication channel 502, which is established between user 102 and service provider 108, enables a set of registration information to be exchanged between user 102 and service provider 108 for the purpose of enabling the service access for user 102. Examples of communication channel 502 include, but are not limited to, the Internet, couriers, and messengers. Examples of the registration information include, but are not limited to, name of user 102, address of user 102, account information for user 102, digital certificates containing the public keys of user 102.

Communication channel 504 enables communication between user 102 and personal communication device 104. User 102 communicates with personal communication device 104 for availing functionalities such as authenticating himself/herself with personal communication device 104 and providing information to personal communication device 104. This communication channel is used to exchange information such as but not limited to the passwords, and biometric information such as finger print templates.

Communication channel 506 enables personal communication device 104 and service outlet 106 to communicate with each other. Personal communication device 104 and service outlet 106 communicate with each other for functionalities such as authentication, information exchange, and service access. According to one embodiment, communication channel 506 enables mutual authentication between personal communication device 104 and service outlet 106. In yet another embodiment, the communication channel 506 carries the service access messages.

Communication channel 506 is established to carry secure data communication using session keys over a communication medium. In one embodiment, the communication medium includes a group of wireless medium such as Bluetooth signals, Near Field Communication signals, infrared signals, and other radio frequency signals. In another embodiment, the communication medium includes a group of wired medium such as serial port cables, Universal Serial Bus (USB), and contact pads. In yet another embodiment, the communication medium includes a combination of the wired medium and the wireless medium.

Communication channel 508 enables communication between user 102 and service outlet 106. User 102 communicates with service outlet 106 for functionalities such as directly authenticating user 102 by service outlet 106 and for providing information to service outlet 106.

Communication channel 510 enables service outlet 106 and service provider 108 to exchange information with each other. Communication channel 510 can be, for example, data communication channels, couriers, posts, and messengers. Further, communication channel 510 can be a regular communication channel or a sporadic communication channel or a continuous data communication channel. Examples of the information exchanged between service outlet 106 and service provider 108 include, but are not limited to, personal information of user 102 registered with service provider 108, digital certificates, and public keys of service provider 108, and public keys of service outlet 106. Examples of the personal information of user 102 include, but are not limited to, name of user 102, address of user 102, and credit card number of user 102.

Interaction system 500, described in accordance with FIG. 5, can be explained with the help of the following example. User 102 uses his/her personal communication device 104, such as a mobile phone, to access the services of service provider 108, such as a bank, through service outlet 106, such as Automatic Teller Machine (ATM). User 102 can authenticate himself/herself to service outlet 106 using his/her personal communication device 104, by using a keypad of personal communication device 104. User 102 can also issue requests to service outlet 106 for accessing services such as withdrawal of money, and view responses on a screen of personal communication device 104 similar to those displayed on the screen of service outlet 106.

According to an embodiment of the present invention, user 102 uses personal communication device 104 to establish his/her authenticity with service outlet 106. According to another embodiment, user 102 directly authenticates himself/herself with service outlet 106, for example, by entering a pass code at the ATM. The method for authenticating user 102 can be decided by service provider 108.

Figure 6:
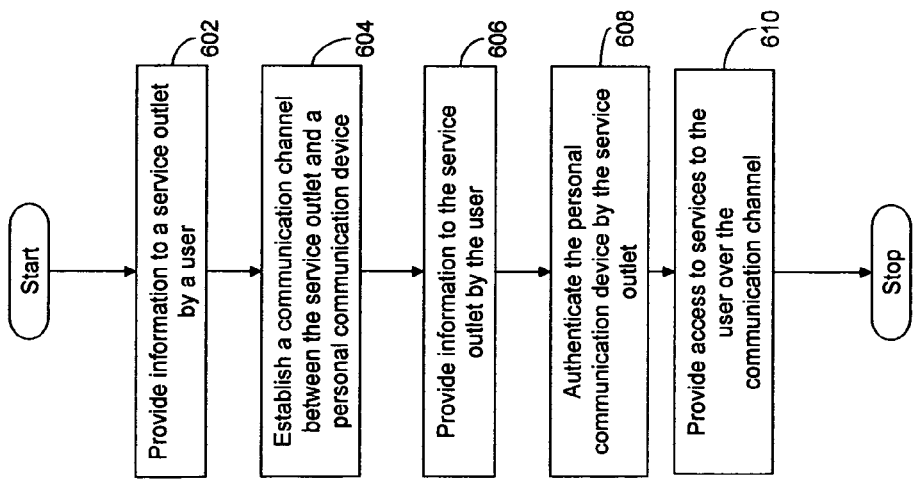
FIG. 6 illustrates a flowchart of a method for accessing services from a service outlet, in accordance with an embodiment of the present invention.

FIG. 6 illustrates a flowchart of a method for accessing services from service outlet 106, in accordance with an embodiment of the present invention. Service outlet 106 offers the services provided by service provider 108. Service outlet 106 offers these services to users registered with service provider 108, such as user 102. Further, service outlet 106 receives a first set of information from a user, and further stores a second set of information that is not specific to any user. Examples of the second set of information include, but are not limited to, public keys of service provider 108, digital certificates of service provider 108, and digital certificates of service outlet 106. Each user can access the services from service outlet 106 by using personal communication device 104. The method for accessing services from service outlet 106 can preferably be the same for all users of service outlet 106. Therefore, for the sake of clarity of description, the method has been explained only for user 102.

At step 602, user 102 provides the first set of information to service outlet 106. Examples of the first set of information include, but are not limited to, a public key of user 102 and a digital certificate of user 102. For example, in interaction system 100, user 102 provides the first set of information to service outlet 106. In one embodiment of this invention, the first set of information may be provided through the personal communication device 104 using a secure element 206. In another embodiment of this invention, the first set of information may be provided through the personal communication device 104 without the secure element 206. In yet another embodiment of this invention, the first set of information may be provided through the secure element 206 communicating directly with the service outlet 106.

According to an embodiment of the present invention, user 102 provides a set of account information to service outlet 106 which includes information about an account of user 102 with service provider 106. Examples of the set of account information include, but are not limited to, identification information, validity date of the account, account number, and balance in the account.

At step 604, service outlet 106 and personal communication device 104 jointly establish a secure communication channel. The communication channel is established based on the second set of information and the first set of information. The second set of information is provided to personal communication device 104 by service outlet 106. According to an embodiment of the present invention, service outlet 106 authenticates personal communication device 104 based on the first set of information and the second set of information, to establish the communication channel. According to another embodiment of the present invention, personal communication device 104 authenticates service outlet 106 to establish the communication channel. According to yet another embodiment of the present invention, personal communication device 104 and service outlet 106 mutually authenticate each other to establish the communication channel. Personal communication device 104 and service outlet 106 mutually authenticate each other based on the first and the second set of information.

According to an embodiment of the present invention, the communication channel is made secure by using cryptography algorithms. Examples of the cryptography algorithms include, but are not limited to, RSA encryption, Data Encryption Standard (DES), and Advanced Encryption Standard (AES).

At step 606, personal communication device 104 provides a third set of information to service outlet 106. The third set of information is provided over the communication channel between personal communication device 104 and service outlet 106. The third set of information is based on the set of protected information and the set of secret information.

At step 608, service outlet 106 authenticates personal communication device 104 based on the third set of information.

At step 610, access to the services is provided to user 102 by service outlet 106.

According to an embodiment of the present invention, to access the services, software is needed at personal communication device 104. The software enables personal communication device 104 to carry out instructions provided by user 102. Further, the software displays menus/options to user 102, takes input from user 102, processes the input, and provides a set of information to service outlet 106 for further processing.

The software instructions are loaded in personal communication device 104 at the time of registration of user 102 at service provider 108. Alternatively, the software instructions can be loaded in personal communication device 104 at the time of service initiation after the authentication of the software by service provider 108 or by service outlet 106.

Thereafter, the method is terminated by ending a communication session between personal communication device 104 and service outlet 106. The communication session between service outlet 106 and personal communication device 104 may be ended by either of service outlet 106 and personal communication device 104.

According to an embodiment of the present invention, the communication session is terminated after personal communication device 104 finishes accessing the services from service outlet 106. According to another embodiment of the present invention, the communication session is terminated after a predetermined time interval since the last activity/data exchange between personal communication device 104 and service outlet 106. According to still another embodiment of the present invention, the communication session is terminated upon a request made by user 102.

Figure 7:
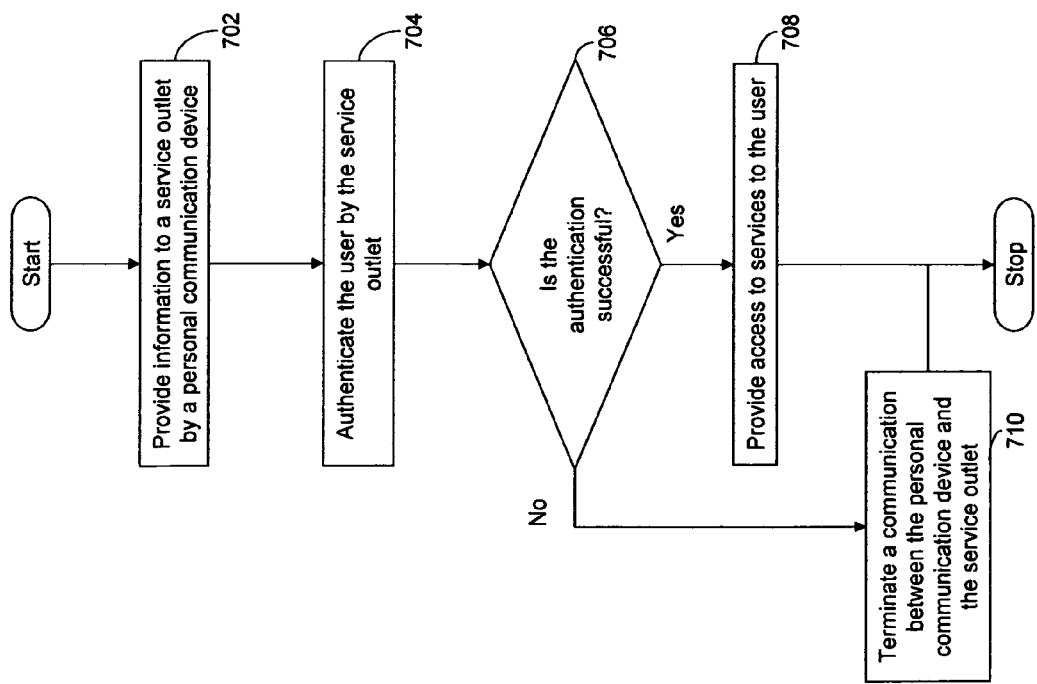
FIG. 7 illustrates a flowchart of a method for accessing services from a service outlet, in accordance with another embodiment of the present invention.

FIG. 7 illustrates a flowchart of a method for accessing the services offered by service provider 108 from service outlet 106, in accordance with an embodiment of the present invention.

At step 702, personal communication device 104 provides the third set of information to service outlet 106.

At step 704, service outlet 106 authenticates user 102. Service outlet 106 authenticates user 102 based on the third set of information provided by personal communication device 104 to service outlet 106.

At step 706, service outlet 106 checks for the success of the authentication. If the authentication is successful, step 708 is performed. If the authentication is not successful, step 710 is performed.

According to an embodiment of the present invention, various authentication mechanisms such as a challenge-response scheme can be used for authentication. In the challenge-response authentication scheme, an entity that is trying to establish authenticity of the other device is known as a challenger and its counterpart is known as a respondent. The challenger typically issues a random challenge to the respondent who acts on the challenge, generates a response using cryptographic techniques, and sends it to the challenger. The challenger can then verify the response using the issued challenge, thereby establishing the authenticity of the respondent. The same process may be repeated after reversing the roles of the challenger and the respondent. The process in which both sides establish authenticity of the other side is known as a mutual authentication process.

According to another embodiment of the present invention, a public-key cryptography scheme is used for authentication. In the public-key cryptography scheme, public keys of user 102, the information associated with the public keys of user 102, public keys of service outlet 106, and the information associated with the public keys of service outlet 106 are used for authentication. Further, in the public-key cryptography scheme, a variety of published or unpublished key exchange protocols may be used to establish a secret session key between personal communication device 104 and service outlet 106. An example of the key exchange protocol may be, but not limited to, Diffie-Hellman key exchange protocol.

According to still another embodiment of the present invention, a combination of the challenge-response scheme and the public-key cryptography scheme is used for authentication. The following example explains using a combination of the challenge-response scheme and the public-key cryptography scheme for authentication. In the illustration, a certifying authority issues a certificate for a public key of user 102. The certifying authority further issues a certificate for a public key of service outlet 106. For authentication, personal communication device 104 presents the certificate for the public key of user 102 to service outlet 106. Service outlet 106 verifies the authenticity and the integrity of the certificate of user 102 using a public key of the certifying authority. Service outlet 106 then issues a challenge to personal communication device 104 to verify if personal communication device 104 possesses a private key corresponding to the public key of user 102. Personal communication device 104 may operate on the challenge using the private key of user 102, with or without a support of secure element 206. Personal communication device 104 then returns a response to service outlet 106. Service outlet 106 verifies if the response is as expected based on the challenge and if the response is compatible with the public key provided by personal communication device 104. If the response is as expected, personal communication device 104 is considered authentic by service outlet 106.

At step 708, access to the services is provided to user 102 by service outlet 106 when the authentication is successful. According to an embodiment of the present invention, the communication session is terminated after personal communication device 104 finishes accessing the services from service outlet 106.

If the authentication at step 706 is unsuccessful, then, at step 710, the communication session between personal communication device 104 and user 102 is terminated.

Figure 8:
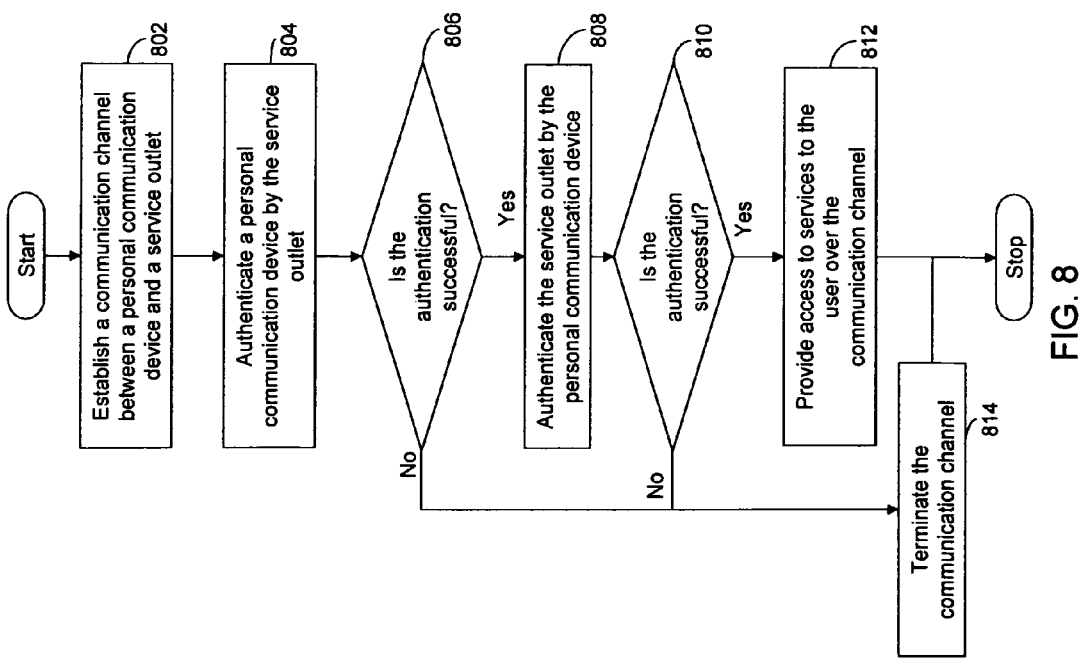
FIG. 8 illustrates a flowchart of a method for accessing services from a service outlet, in accordance with still another embodiment of the present invention.

FIG. 8 illustrates a flowchart of a method for accessing the services from service outlet 106, in accordance with an embodiment of the present invention.

At step 802, a communication channel is established between personal communication device 104 and service outlet 106. According to an embodiment of the present invention, the communication channel is established on a wireless medium. According to another embodiment of the present invention, the communication channel is established on a wired medium. According to yet another embodiment of the present invention, the communication channel is established on a combination of a wireless medium and a wired medium. Examples of the wireless medium include, but are not limited to, Bluetooth signals, Near Field Communication signals, infrared signals, and radio frequency signals. Examples of the wired medium include, but are not limited to, serial port cable and Universal Serial Bus.

According to an embodiment of the present invention, the communication channel between personal communication device 104 and service outlet 106 is made secure to prevent an external entity from reading or modifying the messages exchanged over the communication channel. The communication channel can be made secure using various mechanisms including, key-exchange protocols, public-key cryptography, and a combination of key-exchange protocols and public-key cryptography. The key-exchange protocols are implemented by generating a session key by one of the parties and sending it securely with the use of secure mechanisms such as public-key cryptography, to the other party, or by generating a session key by exchanging some independent information between the two parties and using it to generate the session key. Further, the session key is used by personal communication device 104 and service outlet 106 to encrypt the messages communicated between them. The session key is also used by personal communication device 104 and service outlet 106 to decrypt the encrypted messages.

At step 804, service outlet 106 authenticates personal communication device 104 based on the second set of information stored in service outlet 106 and the third set of information provided by personal communication device 104.

At step 806, service outlet 106 checks for the success of the authentication. If the authentication is successful, step 808 is performed. If the authentication is not successful, step 814 is performed.

At step 808, personal communication device 104 authenticates service outlet 106. Service outlet 106 is authenticated based on the second set of information provided by service outlet 106 to personal communication device 104. Step 810 is preferably performed after step 808.

At step 810, personal communication device 104 checks for the success of the authentication. If the authentication is successful, step 812 is performed. If the authentication is not successful, step 814 is performed.

At step 812, access to the services is provided to user 102 by service outlet 106. User 102 can access the services over the communication channel established between personal communication device 104 and service outlet 106. According to an embodiment of the present invention, the communication session is terminated after personal communication device 104 finishes accessing the services from service outlet 106.

At step 814, the communication channel between personal communication device 104 and user 102 is terminated.

Figure 9:
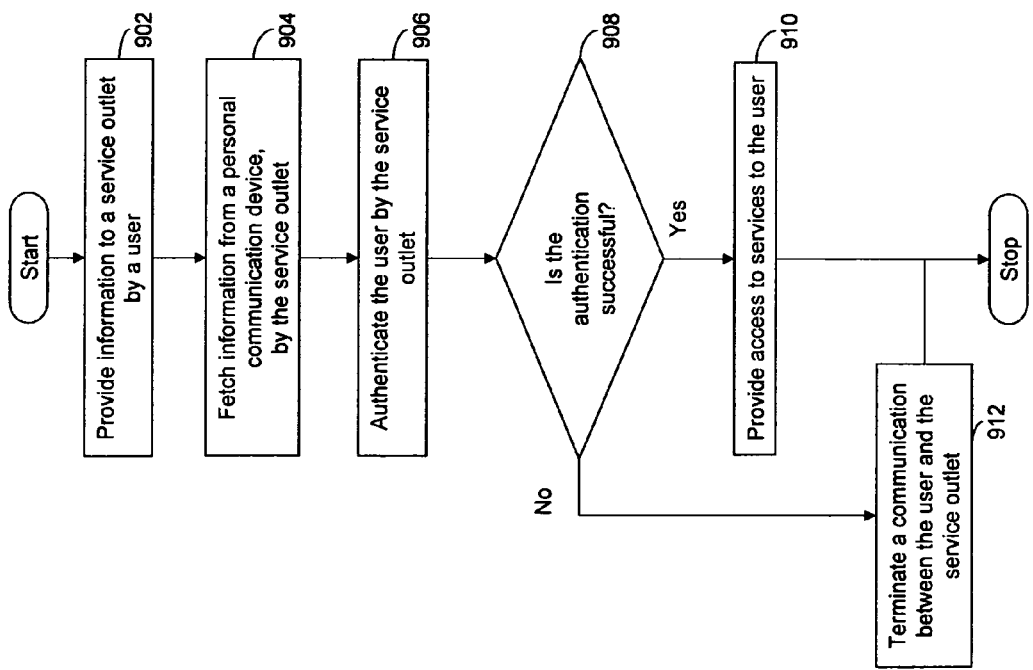
FIG. 9 illustrates a flowchart of a method for accessing services from a service outlet, in accordance with yet another embodiment of the present invention.

FIG. 9 illustrates a flowchart of a method for accessing the services from service outlet 106, in accordance with an embodiment of the present invention.

At step 902, user 102 provides a set of information to service outlet 106 for direct authentication with service outlet 106.

Examples of the set of information include, but are not limited to, a set of biometric information, a set of personal information, a password, a Personal Identification Number (PIN). Examples of the set of biometric information include, but are not limited to, finger print information, voice sample, iris pattern image, gene sequence information, keystroke pattern information, body temperature information, hand geometry information, signature information, ear canal information, vein information, and eye ball squint information. Examples of the set of personal information of user 102 include, but are not limited to, name of user 102, address of user 102, account number of user 102, customer number of user 102, credit card number of user 102, and social security number of user 102.

According to an embodiment of the present invention, user 102 provides a set of information to service outlet 106 through an input interface of service outlet 106. Examples of the input interface of service outlet 106 include, but are not limited to, keyboard, touchscreen, and IC-card slot.

According to another embodiment of the present invention, user 102 provides the set of information to service outlet 106 over a phone connection for data communication.

At step 904, service outlet 106 fetches a set of information from personal communication device 104 to establish authenticity of user 102. Alternatively, service provider 108 can certify the set of information to establish authenticity of user 102. In one embodiment of this invention, the personal communication device 104 may provide the set of information through the secure element 206. In another embodiment of this invention, the personal communication device 104 may provide the set of information through memory module 306.

At step 906, service outlet 106 authenticates user 102. Service outlet 106 authenticates user 102 based on the set of information provided by user 102 and the set of information fetched from personal communication device 104.

The set of information used by service outlet 106 to authenticate user 102 is obtained from one of one or more biometric mechanisms, one or more non-biometric mechanisms, or a combination of one or more biometric mechanisms and one or more non-biometric mechanisms. Examples of the biometric mechanisms include, but are not limited to, finger print recognition, voice recognition, iris pattern recognition, gene sequence recognition, keystroke pattern recognition, body temperature recognition, hand geometry recognition, signature recognition, ear canal recognition, vein recognition, and eye ball squint recognition. Examples of the non-biometric mechanisms include, but are not limited to, password verification and personal identification number verification.

According to an embodiment of the present invention, service outlet 106 authenticates user 102 based only on the set of information provided by user 102.

At step 908, service outlet 106 checks for the success of the authentication. If the authentication is successful, step 910 is performed. If the authentication is not successful, step 912 is performed.

At step 910, access to the services is provided to user 102 by service outlet 106. According to an embodiment of the present invention, the communication session is terminated after personal communication device 104 finishes accessing the services from service outlet 106.

At step 912, the communication between user 102 and service outlet 106 is terminated.

Figure 10:
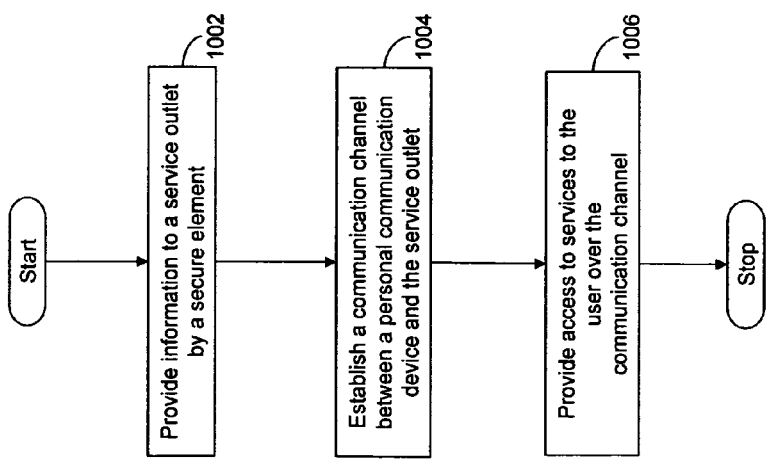
FIG. 10 illustrates a flowchart of a method for accessing services from a service outlet, in accordance with still another embodiment of the present invention.

FIG. 10 illustrates a flowchart of a method for accessing the services from service outlet 106, in accordance with an embodiment of the present invention.

At step 1002, secure element 206 provides a set of information to service outlet 106.

According to an embodiment of the present invention, secure element 206 stores a set of protected information. According to another embodiment of the present invention, secure element 206 stores a set of protected information and a set of public information.

According to an embodiment of the present invention, the set of protected information is not accessible to user 102 and service outlet 106. The set of information provided by secure element 206 to service outlet 106 is calculated by performing an operation on the set of protected information.

According to an embodiment of the present invention, secure element 206 is embedded in personal communication device 104. Secure element 206 provides the set of information to service outlet 106 over a communication channel between personal communication device 104 and service outlet 106.

According to another embodiment of the present invention, secure element 206 is embedded in a device other than personal communication device 104. Secure element 206 provides the set of information to service outlet 106 over a communication channel between secure element 206 and service outlet 106. The communication channel between secure element 206 and service outlet 106 can be established on a wireless medium, a wired medium or a combination of a wireless medium and a wired medium.

At step 1004, service outlet 106 establishes a communication channel between personal communication device 104 and service outlet 106, based on the set of information provided by secure element 206 to service outlet 106.

According to an embodiment of the present invention, service outlet 106 authenticates personal communication device 104 based on the set of information provided by secure element 206 to service outlet 106.

According to another embodiment of the present invention, service outlet 106 authenticates personal communication device 104 based on the set of information provided by secure element 206 to service outlet 106, and a set of information fetched from personal communication device 104.

At step 1006, access to the services is provided to user 102 by service outlet 106. According to an embodiment of the present invention, the communication session is terminated after personal communication device 104 finishes accessing the services from service outlet 106.

Figure 11:
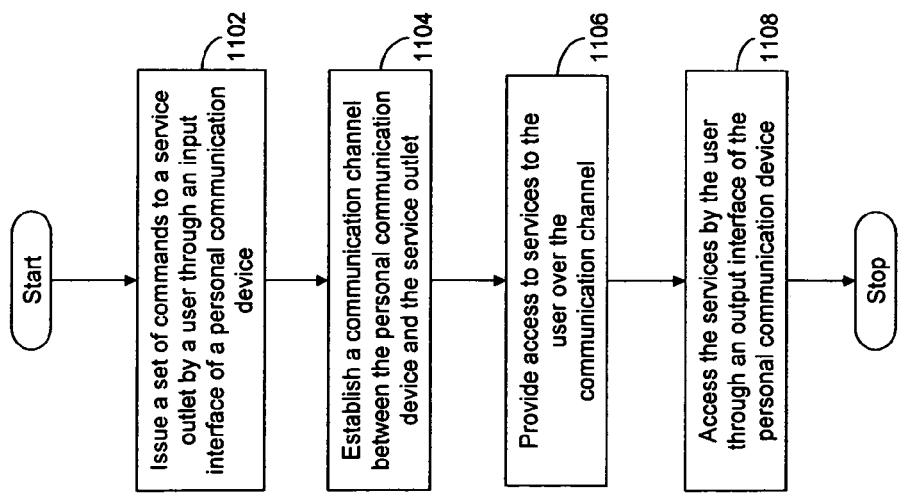
FIG. 11 illustrates a flowchart of a method for accessing services from a service outlet, in accordance with yet another embodiment of the present invention.

FIG. 11 illustrates a flowchart of a method for accessing the services from service outlet 106, in accordance with an embodiment of the present invention.

At step 1102, user 102 issues a set of commands to service outlet 106 through input interface 302 of personal communication device 104. User 102 issues the set of commands to access the services from service outlet 106.

At step 1104, service outlet 106 establishes a communication channel between personal communication device 104 and service outlet 106. Service outlet 106 establishes the communication channel in response to the commands issued by user 102.

At step 1106, access to the services is provided to user 102 by service outlet 106. User 102 can access the services over the communication channel established between personal communication device 104 and service outlet 106.

At step 1108, user 102 accesses the services provided by service outlet 106. User 102 accesses the services through output interface 304 of personal communication device 104. According to an embodiment of the present invention, the communication session is terminated after personal communication device 104 finishes accessing the services from service outlet 106.

Figure 12:
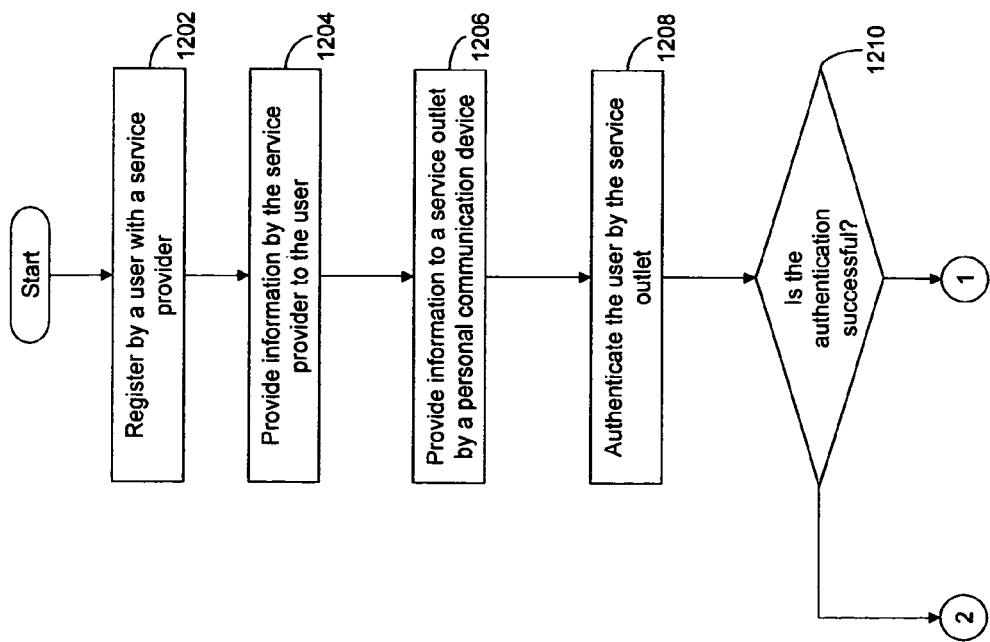
FIGS. 12A and 12B illustrate flowcharts of a method for accessing services from a service outlet, in accordance with yet another embodiment of the present invention.
Figure 12:
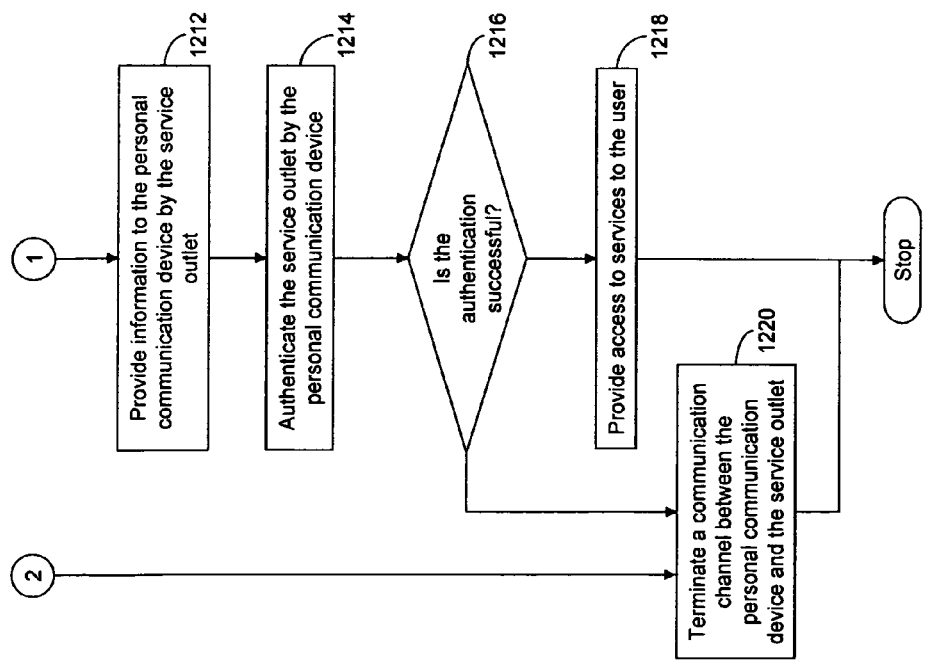

FIGS. 12A and 12B illustrate flowcharts of a method for accessing the services from service outlet 106, in accordance with yet another embodiment of the present invention. Service outlet 106 offers the services provided by service provider 108.

At step 1202, user 102 registers with service provider 108 to access the services. User 102 registers with service provider 108 by providing a set of information associated with user 102. Examples of the set of information associated with user 102 include, but are not limited to, personal information of user 102, public keys, and digital signatures. User 102 registers with service provider 108 over a first communication channel between user 102 and service provider 108. Examples of the first communication channel include, but are not limited to, data communication channels, couriers, posts, and messengers.

According to an embodiment of the present invention, user 102 registers with service provider 108 only once. According to another embodiment of the present invention, user 102 registers with service provider 108 after regular time intervals. According to yet another embodiment of the present invention, user 102 registers with service provider 108 after sporadic time intervals. According to still another embodiment of the present invention, user 102 registers with service provider 108 whenever account/authentication-related information of user 102 changes or requires update.

At step 1204, service provider 108 provides a set of registration information to user 102. Examples of the set of registration information include, but are not limited to, digital certificate and account information with the digital signature from the service provider. Service provider 108 provides the set of registration information to user 102 over a second communication channel. Examples of the second communication channel include, but are not limited to, data communication channels, couriers, posts, and messengers. According to an embodiment of the present invention, user 102 stores the set of registration information in personal communication device 104. According to another embodiment of the present invention, service provider 108 directly sends the set of registration information to personal communication device 104.

At step 1206, personal communication device 104 associated with user 102 provides a set of information to service outlet 106. The set of information provided to service outlet 106 is selected from the set of registration information. Personal communication device 104 provides the set of information to service outlet 106 over a third communication channel.

At step 1208, service outlet 106 authenticates user 102. The authentication is done on the basis of the set of information provided by personal communication device 104 and the set of information provided by service provider 108 to service outlet 106.

At step 1210, service outlet 106 checks for the success of the authentication. If the authentication is successful, step 1212 is performed. If the authentication is not successful, step 1220 is performed.

At step 1212, service outlet 106 provides a set of information to personal communication device 104. Service outlet 106 provides the similar set of information to personal communication device 104.

At step 1214, personal communication device 104 authenticates service outlet 106 based on the set of information provided by service outlet 106 to personal communication device 104 and the set of registration information.

At step 1216, user 102 checks for the success of the authentication of service outlet 106 through personal communication device 104. If the authentication is successful, step 1218 is performed. If the authentication is not successful, step 1220 is performed.

If the authentication is successful, at step 1218, access to the services is provided to user 102 by service outlet 106. According to an embodiment of the present invention, the communication session is terminated after personal communication device 104 finishes accessing the services from service outlet 106.

At step 1220, the communication channel between personal communication device 104 and service outlet 106 is terminated.

According to various embodiment of the present invention, service outlet 106 maintains a record of service transactions and corresponding information. Examples of the information corresponding to the record of service transactions include, but are not limited to, type of transactions, cost-related information of service transactions, date and time of service transactions, and location of service transactions.

According to an embodiment of the present invention, the record of the service transactions is updated on a central database/server of service provider 108.

According to another embodiment of the present invention, the record of the service transactions is loaded in personal communication device 104. According to still another embodiment of the present invention, the record of the service transactions is stored in secure element 206.

According to yet another embodiment of the present invention, the record of service transactions is communicated between service outlet 106 and service provider 108 during the authentication of user 102. According to another embodiment of the present invention, the record of service transactions is communicated between service outlet 106 and service provider 108 during the access of services by user 102. According to yet another embodiment of the present invention, the record of service transactions is periodically communicated between service outlet 106 and service provider 108 such that the period is determined according to the type of services. According to still another embodiment of the present invention, the record of service transactions is sporadically communicated between service outlet 106 and service provider 108 such that the sporadic period is determined based on the cost of communication. According to yet another embodiment of the present invention, the record of service transactions is communicated between service outlet 106 and service provider 108 when service provider 108 makes a request for it.

According to an embodiment of the present invention, the record of service transactions is communicated over a communication channel, which is selected depending on the method of communication, the requirements of service provider 108, and the services. Examples of the communication channel include, but are not limited to, mobile phones, landline phones, terminals attached to service outlets, postal services, couriers, messengers, and a combination thereof.

User 102 may discontinue service-access ability of personal communication device 104 by deleting the set of registration information from personal communication device 104.

In accordance with the present invention, the method and interaction system for accessing services from the service outlet have various advantages. For example, the present invention facilitates mutual authentication between a user and a service outlet which prevents the user from accessing counterfeit services from fake outlets. Further, the present invention eliminates the need of communication between the service outlet and a service provider at the time of authentication of the user which leads to quick authentication and provides fast service access. Furthermore, the present invention uses secret information stored in a secure element for authentication which makes the authentication reliable. Also, the present invention enables the user to access services from the service outlet through a personal communication device which enables ease of access.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for providing access to a plurality of services offered by a service provider, the method comprising:
    providing personal information of a user by a personal communication device to the service provider for accessing the plurality of services, the personal communication device being associated with the user;
    receiving a set of registration information from the service provider at the personal communication device;
    providing a first set of information to a service outlet by the personal communication device, wherein the first set of information is selected from the set of registration information;
    providing a second set of information to the personal communication device by the service outlet, the service outlet being associated with the service provider, wherein the second set of information is related to the service provider and is not user-specific;
    authenticating the personal communication device and the service outlet based on the first set of information and the second set of information;
    establishing a communication channel between the personal communication device and the service outlet, the communication channel being established based on the authentication of the personal communication device and the service outlet;
    receiving a third set of information at the service outlet from the personal communication device;
    authenticating the personal communication device by the service outlet based on the second set of information and the third set of information;
    authenticating the service outlet by the personal communication device based on the second set of information; and
    receiving access to the plurality of services from the service outlet, the access being received over the communication channel through the personal communication device.

2. The method according to claim 1 further comprising terminating the communication channel between the personal communication device and the service outlet when authentication of the personal communication device at the service outlet is not successful.

3. The method according to claim 1, wherein establishing the communication channel between the personal communication device and the service outlet comprises establishing the communication channel on at least one of a wireless medium and a wired medium.

4. The method according to claim 1, wherein establishing the communication channel between the personal communication device and the service outlet comprises authenticating the user to the personal communication device.

5. The method according to claim 4, wherein authenticating the user at the personal communication device is based on a biometric mechanism, the biometric mechanism being selected from a group consisting of finger print recognition, voice recognition, iris pattern recognition, gene sequence recognition, keystroke pattern recognition, body temperature recognition, hand geometry recognition, signature recognition, ear canal recognition, vein recognition, and eye ball squint recognition.

6. The method according to claim 4, wherein authenticating the user at the personal communication device is based on a non-biometric mechanism, the non-biometric mechanism being selected from a group consisting of password verification and personal identification number verification.

7. The method according to claim 1, wherein the personal communication device associated with the user is one of a secure element, a device embedded with a secure element, and a device different from another device embedding a secure element.

8. A method for providing access to a plurality of services offered by a service provider, the method comprising:
    providing a first set of information to a service outlet by a personal communication device, wherein the first set of information is selected from a set of registration information;
    receiving a second set of information at the personal communication device from the service outlet, wherein the second set of information is related to the service provider and is not user specific;
    establishing a communication channel between a personal communication device and the service outlet, the personal communication device being associated with a user and the service outlet being associated with the service provider;
    receiving a third set of information at the service outlet from the personal communication device;
    authenticating the personal communication device at the service outlet over the communication channel based on the second set of information and the third set of information;

authenticating the service outlet at the personal communication device over the communication channel based on the second set of information; and providing the personal communication device access to the plurality of services at the service outlet.

9. The method according to claim 8, wherein the personal communication device associated with the user is one of a secure element, a device embedded with a secure element, and a device different from another device embedding a secure element.

10. The method according to claim 8, wherein authenticating the personal communication device at the service outlet further comprises establishing the communication channel between the secure element and the personal communication device, the communication channel being established over at least one of a wired medium and a wireless medium.

11. The method according to claim 10, wherein establishing the communication channel between the secure element and the personal communication device over the wired medium comprises selecting the wired medium from a group consisting of serial port cable, universal serial bus, and contact pad.

12. The method according to claim 10, wherein establishing the communication channel between the secure element and the personal communication device over the wireless medium comprises selecting the wireless medium from a group consisting of Bluetooth signals, Near Field communication signals, infrared signals, and radio frequency signals.

13. The method according to claim 8, wherein authenticating the personal communication device at the service outlet and authenticating the service outlet at the personal communication device comprises selecting an authentication scheme.

14. The method according to claim 13, wherein selecting the authentication scheme comprises selecting the authentication scheme from a group consisting of a public key cryptography scheme, a challenge-response scheme, and a combination of the public key cryptography scheme and the challenge-response scheme.

15. The method according to claim 14, wherein selecting the public key cryptography scheme comprises using a set of information, the set of information selected from a group consisting of one or more public keys of the user, a set of information of the one or more public keys of the user, one or more public keys of the service outlet, and a set of information of the one or more public keys of the service outlet.

16. The method according to claim 15, wherein selecting the public key cryptography scheme further comprises: certifying the one or more public keys of the user by a certifying authority from a plurality of certifying authorities; certifying the one or more public keys of the service outlet by the certifying authority, wherein the user and the service outlet store information, related to one or more public keys of the certifying authority; and checking authenticity of the one or more public keys of the user and the one or more public keys of the service outlet, wherein the checking is based on a certificate provided by the certifying authority.

17. The method according to claim 14, wherein selecting the challenge-response scheme comprises: using one or more public keys of the user and one or more public keys of the service outlet for authentication; and computing responses in the challenge-response scheme, based on one or more private keys of the user and one or more private keys of the service outlet.

18. The method according to claim 8 further comprising authenticating the user at the service outlet.

19. The method according to claim 18 further comprising terminating the communication channel between the personal communication device and the service outlet when authentication of the user at the service outlet is not successful.

20. The method according to claim 8 further comprising securing the communication channel between the personal communication device and the service outlet.

21. The method according to claim 20, wherein securing the communication channel comprises securing the communication channel between the personal communication and the service outlet based on one or more key-exchange protocols, public key cryptography, and a combination of the one or more key-exchange protocols and the public key cryptography.

22. The method according to claim 8, wherein the personal communication device associated with the user is one of a secure element, a device embedded with a secure element, and a device different from another device embedding a secure element.

23. A method for providing access to a plurality of services offered by a service provider, the method comprising:

registering a user with the service provider for accessing the plurality of services;

receiving a set of registration information from the service provider at a personal communication device, the personal communication device being associated with the user;

providing a first set of information to a service outlet, the first set of information being provided by the personal communication device, wherein the first set of information is selected from the set of registration information;

providing a second set of information to the personal communication device by the service outlet, the service outlet being associated with the service provider, wherein the second set of information is related to the service provider and is not user-specific;

determining that the personal communication device is authenticated by the service outlet, wherein the personal communication device is authenticated based on the first set of information and the second set of information stored in the service outlet;

receiving a third set of information at the personal communication device, the third set of information being received from the service outlet;

authenticating the personal communication device at the service outlet based on the second set of information and the third set of information;

authenticating the service outlet at the personal communication device based on the second set of information; and receiving access to the plurality of services from the service outlet, the access being received by the user through the personal communication device.

24. The method according to claim 23 further comprising providing a set of transaction information by the service outlet to the service provider, wherein the set of transaction information is provided over a communication channel between the service outlet and the service provider.

25. The method according to claim 24, wherein the communication channel between the service outlet and the service provider is one of a regular data communication channel, a sporadic data communication channel and a continuous data communication channel.

26. The method according to claim 24, wherein the communication channel between the service outlet and the service provider is selected from at least one of data communication channel, mobile telephony, landline telephone, a terminal attached to the service outlet, postal services, couriers, and messengers.

27. The method according to claim 23, wherein the personal communication device associated with the user is one of a secure element, a device embedded with a secure element, and a device different from another device embedding a secure element.

28. An interaction system, comprising:
a service outlet, the service outlet capable of providing access to a plurality of services to a user, the service outlet storing a first set of information, the service outlet being associated with a service provider wherein the first set of information is selected from the set of registration information; and
a personal communication device associated with the user, the personal communication device:
storing a second set of information wherein the second set of information is provided by the service outlet, the second set of information being related to the service provider and is not user-specific; and
providing a third set of information to the service outlet, wherein the personal communication device is authenticated based on the second set of information and the third set of information and the service outlet is authenticated based on the second set of information stored by the service outlet, wherein the service outlet provides access to the plurality of services to the user when authentication of the personal communication device at the service outlet and authentication of the service outlet by the personal communication device are successful.

29. The interaction system according to claim 28, wherein the personal communication device comprises:
a processor, the processor capable of performing computational tasks;
a memory module, the memory module capable of storing the second set of information; and
a communication module, the communication module enabling the personal communication device to communicate with the service outlet.

30. The system according to claim 28, wherein the personal communication device further comprises:
an input interface, the input interface enabling the personal communication device to receive information from the user, the input interface being selected from a group consisting of a keypad, a touchpad, a touch screen, and a voice-based input interfaces; and
an output interface, the output interface providing the user access to the plurality of services, the output interface being selected from a group consisting of a display screen and a sound-based output interface.

31. The system according to claim 28, wherein the personal communication device is selected from a group consisting of mobile phones, Personal Digital Assistants (PDAs), mobile computers, and desktop computers.

32. The system according to claim 28, wherein the user is capable of authenticating the service outlet.

33. The system according to claim 32, wherein the service outlet provides the user access to the plurality of services when authentication of the personal communication device at the service outlet and authentication of the service outlet at the personal communication device is successful.

34. The system according to claim 28, wherein the second set of information is based on a set of secret information and a set of protected information.

35. The system according to claim 34, wherein the set of secret information is stored in a secure element.

36. The system according to claim 35, wherein the personal communication device is the secure element.

37. The system according to claim 35, wherein the secure element is selected from a group consisting of a smart card, a Near Field communication card, a subscriber's identity module, an e-token, and a memory unit.

38. The system according to claim 28 further comprising a communication channel, the communication channel enabling communication between the personal communication device and the service outlet, wherein the communication channel is established on at least one of a wireless medium and a wired medium.

39. The system according to claim 38, wherein the wireless medium is selected from a group consisting of Bluetooth signals, Near Field communication signals, infrared signals, and radio frequency signals.

40. The system according to claim 38, wherein the wired medium is selected from a group consisting of serial port cable and universal serial bus.

41. The system according to claim 28 further comprising a service provider, the service provider capable of providing the plurality of services to the user, wherein the service provider provides the plurality of services to the user through the service outlet.

42. An interaction system, comprising:
a service outlet, the service outlet providing a user access to a plurality of services, the service outlet being associated with a service provider, the service outlet storing a first set of information, wherein the first set of information is selected from the set of registration information;
a secure element, the secure element being associated with the user, the secure element storing a set of secret information; and
a personal communication device, the personal communication device being associated with the user, the personal communication device storing a set of protected information and a second set of information, the second set of information being provided by the service outlet wherein the second set of information is related to the service provider and is not user-specific, wherein the personal communication device provides a third set of information to the service provider, wherein the personal communication device is authenticated at the service outlet based on the second set of information and the third set of information, wherein the service outlet is authenticated at the personal communication device based on the second set of information, and wherein the service outlet provides the user access to the plurality of services when authentication of the user at the service outlet and authentication of the service outlet by the personal communication device are successful.

43. The system according to claim 42, wherein the secure element comprises:
a memory module, the memory module capable of storing the set of secret information;
a processing module, the processing module capable of performing one or more computational tasks; and
a communication module, the communication module enabling the secure element to communicate with at least one of the service outlet and the personal communication device.

44. The system according to claim 42, wherein the secure element is selected from a group consisting of a smart card, a Near Field communication card, a subscriber's identity module, an e-token, and a memory unit.

45. The system according to claim 42, wherein the secure element is embedded in the personal communication device.

46. The system according to claim 42, wherein the secure element is embedded in the personal communication device in one of the forms of:
- a plurality of hardware elements associated with the personal communication device, and
- a plurality of software modules stored in the personal communication device.

47. The system according to claim 42, wherein the secure element is embedded in a device different from the personal communication device.

48. The system according to claim 47, wherein the secure element and the service outlet communicate over at least one of a wired medium and a wireless medium.

49. The system according to claim 48, wherein the wired medium is selected from a group consisting of serial port cable, universal serial bus, and contact pad.

50. The system according to claim 48, wherein the wireless medium is selected from a group consisting of Bluetooth signals, Near Field communication signals, infrared signals, and radio frequency signals.

51. The system according to claim 42, wherein the service outlet is capable of authenticating the user based on a set of information received from the user.

52. The system according to claim 51, wherein the service outlet authenticates the user based on one or more biometric mechanisms, wherein the set of information received from the user comprising one or more of finger print recognition information, voice recognition information, iris pattern recognition information, gene sequence recognition information, keystroke pattern recognition information, body temperature recognition information, hand geometry recognition information, signature recognition information, ear canal recognition information, vein recognition information, and eye ball squint recognition information.

53. The system according to claim 51, wherein the service outlet authenticates the user based on one or more non-biometric mechanisms, wherein the set of information received from the user comprises one or more of password information and personal identification number information.

54. An interaction system comprising:
- a service provider, the service provider providing a plurality of services to a user, the service provider further providing a set of registration information to the user;
- a service outlet, the service outlet providing the user access to the plurality of services, the service outlet being associated with the service provider_the service outlet storing a first set of information, wherein the first set of information is selected from the set of registration information; and
- a personal communication device, the personal communication device being associated with the user, the personal communication device:
    - storing the set of registration information received from the service provider;
    - storing a second set of information, wherein the second set of information is provided by the service outlet, the second set of information being related to the service provider and is not user-specific, the service outlet storing the second set of information;
    - providing a third set of information to the service outlet; and
    - authenticating the user and the personal communication device by the service outlet based on the second set of information and the third set of information, and the personal communication device authenticating the service outlet based on the second set of information, wherein the service outlet provides the user access to the plurality of services when authentication of the personal communication device at the service outlet and authentication of the service outlet by the personal communication device are successful.

* * * * *